US010796372B1

(12) United States Patent
Pietrus et al.

(10) Patent No.: US 10,796,372 B1
(45) Date of Patent: *Oct. 6, 2020

(54) CLAIMS ADJUSTER ALLOCATION

(71) Applicant: Allstate Insurance Company, Northbrook, IL (US)

(72) Inventors: Jeana Kay Pietrus, Chicago, IL (US); James Lawrence Edens, Palatine, IL (US)

(73) Assignee: Allstate Insurance Company, Northbrook, IL (US)

( * ) Notice: Subject to any disclaimer, the term of this patent is extended or adjusted under 35 U.S.C. 154(b) by 247 days.

This patent is subject to a terminal disclaimer.

(21) Appl. No.: 15/919,852

(22) Filed: Mar. 13, 2018

Related U.S. Application Data

(63) Continuation of application No. 13/052,805, filed on Mar. 21, 2011, now Pat. No. 9,947,050.

(51) Int. Cl.
*G06Q 40/08* (2012.01)
*G06Q 10/06* (2012.01)

(52) U.S. Cl.
CPC ....... *G06Q 40/08* (2013.01); *G06Q 10/06311* (2013.01)

(58) Field of Classification Search
CPC .......................... G06Q 40/08; G06Q 10/0631
See application file for complete search history.

(56) References Cited

U.S. PATENT DOCUMENTS

| | | | |
|---|---|---|---|
| 6,914,525 B2 * | 7/2005 | Rao | G08B 21/10 340/531 |
| 7,013,284 B2 | 3/2006 | Guyan et al. | |
| 7,158,628 B2 | 1/2007 | McConnell et al. | |
| 7,275,039 B2 | 9/2007 | Setteducati | |
| 7,363,240 B1 | 4/2008 | Armentano et al. | |
| 7,778,937 B2 | 8/2010 | Ferrara et al. | |
| 7,827,045 B2 | 11/2010 | Madill, Jr. et al. | |
| 7,831,978 B2 | 11/2010 | Schaad | |

(Continued)

OTHER PUBLICATIONS

Wallace, et al., "A Staffing Algorithm for Call Centers with Skill-Based routing", Manufacturing & Service Operations Management, vol. 7, No. 4, Fall 2005, pp. 276-294. (Year: 2005).*

(Continued)

*Primary Examiner* — Eric T Wong
(74) *Attorney, Agent, or Firm* — Banner & Witcoff, Ltd.

(57) ABSTRACT

A central claims adjuster control unit associated with an entity may oversee the assignment of claims cases to claims adjusters. The control unit may designate that a threshold number of cases may be assigned to certain claims adjusters. When new claims cases arrive, the control unit may monitor the workload of each of the claims adjusters and the threshold value assigned to any of the claims adjusters before assigning the case to one of the adjusters. If no adjuster is available, the control unit may store the case(s) in a memory until one of the adjusters becomes available. An additional feature of the control unit includes a user interface for modifying information about claims adjusters, including whether or not a threshold value is associated with them, the value of any associated threshold, and the reassignment of cases from one adjuster to another.

20 Claims, 5 Drawing Sheets

(56) References Cited

U.S. PATENT DOCUMENTS

| | | | | |
|---|---|---|---|---|
| 7,933,786 | B2* | 4/2011 | Wargin | G06Q 10/06 705/4 |
| 8,280,633 | B1* | 10/2012 | Eldering | G06Q 40/08 702/3 |
| 8,401,896 | B2* | 3/2013 | Wargin | G06Q 10/06 705/4 |
| 2004/0225535 | A1* | 11/2004 | Bond, Jr. | G06Q 40/02 705/4 |
| 2007/0100669 | A1 | 5/2007 | Wargin et al. | |
| 2008/0015968 | A1* | 1/2008 | Van Luchene | G06Q 10/087 705/37 |
| 2009/0094086 | A1* | 4/2009 | Bruno | G06Q 10/00 705/7.13 |
| 2010/0049551 | A1 | 2/2010 | Scully | |
| 2010/0094836 | A1* | 4/2010 | Duncan | G06Q 30/04 707/705 |
| 2011/0066556 | A1* | 3/2011 | Kadosh | G06Q 10/06 705/80 |

OTHER PUBLICATIONS

Dighe, A.S., et al., "Analysis of Laboratory Critical Value Reporting at a Large Academic Medical Center", American Journal of Clinical Pathology, May 2006, pp. 758-764.

Faulhaber, R., "Better Self-Insurance Through Technology", The John Liner Review, vol. 17, No. 2, Summer 2003, 10 pages.

Pettersson, M., "WaterCalls: An Ambient Call Queue for Cooperation Between Emergency Service Centers", Pers Ubiquit Comput, Jun. 19, 2004, pp. 192-199.

Wallace, et al., "A Staffing Algorithm for Call Centers with Skill-Based Routing", Manufacturing & Service Operations Management, vol. 7, No. 4, Fall 2005, pp. 276-294.

Praskey, S., "Faster, Cheaper, Better: A New Model for Claims Processing", —Canadian Insurance, Jan. 2004, 3 pages.

Mylopoulos, J., et al., "Tropos: A Framework for Requirements-Driven Software Development", Information Systems Engineering: State of the Art and Research Themes, Lecture Notes in Computer Science, Jun. 2000, 12 pages.

Oct. 18, 2016—U.S. Office Action—U.S. Appl. No. 13/052,805.

Jun. 6, 2017—U.S. Non-Final Office Action—U.S. Appl. No. 13/052,805.

Dec. 13, 2017—U.S. Notice of Allowance—U.S. Appl. No. 13/052,805.

\* cited by examiner

Bulk Threshold Assignment

Found: 25   Displaying: 1-13 — 509   511
⦿ Bulk Threshold Update    Threshold Capacity for selected Org Entities [ ] — 513
◯ Assign. Group/Bus. Unit Thresh Update   Receive Assignments from Capacity Entity Only ☐ — 515

Next >>

Search Results — 501

| Assignment Group/Business Unit | Job Title | Threshold Capacity | Receive Assignments from Capacity Entity Only |
|---|---|---|---|
| ☐ 1 | Adjuster-Inside | 100 | ☐ |
| ☐ 2 | Coordinator | 100 | ☐ |
| ☐ 3 | Adjuster-Inside | 100 | ☐ |
| ☐ 4 | Coordinator | 100 | ☐ |
| ☐ 5 | | 100 | ☐ |
| ☐ 6 | | 100 | ☐ |
| ☐ 7 | | 100 | ☐ |
| ☐ 8 | | 100 | ☐ |
| ☐ 9 | | 100 | ☐ |
| ☐ 10 | | 100 | ☐ |
| ☐ 11 | | 100 | ☐ |
| ☐ 12 | | 100 | ☐ |
| ☐ 13 | | 100 | ☐ |

503    505    507

[Select All]  [Deselect All]              [Back]  [Save]

CLAIMS ADJUSTER ALLOCATION

FIELD

Aspects of the disclosure relate generally to insurance claim handling. More particularly, the disclosure relates to a system and method for managing insurance claims and adjuster workloads.

BACKGROUND

After a person has incurred an unfortunate loss of property caused by a catastrophic event, such as damage to a home by a hurricane, that person may be eager to begin financial recovery by filing an insurance claim. Typically an insurance company tries to handle the claim with reasonable timeliness but may be hampered by the volume and inherent complexity of claims and the limits of prior art systems and methods.

Depending on the severity of a catastrophic event, the region affected, and the number of customers affected, personnel (e.g., claim adjusters, etc.) for reviewing and processing claims may be limited. For example, when a catastrophic event (e.g., natural disaster, etc.) occurs, many regions and people may be affected, increasing the number of claims the insurance company has to process. Numerous claims need to be scheduled, assigned, and managed in an efficient manner to ensure customers receive timely cost effective service.

Recently, developments in software programming and architecture have aided in claim processing efficiency. However, scheduling, allocation, and management of claims to appropriate claims adjusters in the wake of a catastrophe still needs improvement. For instance, many spreadsheets of information may be collected and analyzed to determine adjuster allocation in the aftermath of a catastrophe. Such spreadsheet analysis is inefficient and adds additional processing time increasing the total amount of time customers may have to wait to receive a claim payout. In addition, current systems do not address numerous opportunities for improvement in current claims adjuster management, especially during high volume events such as catastrophes.

Therefore, there is a need in the art for systems, apparatuses, and methods for improved insurance claim processing, including more efficient ways to schedule and manage adjuster workloads. Various aspects of the disclosure overcome deficiencies and limitations of the prior art.

BRIEF SUMMARY

The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below.

In one embodiment in accordance with aspects of the disclosure, systems and methods for establishing a claims handling strategy are disclosed. The claims handling strategy may incorporate the concept of a threshold where individual claims adjusters may each be automatically assigned a threshold level of claims cases. After all the adjusters have reached their threshold, the remaining cases are thrown into a "parking lot" where the cases wait until an adjuster is available for handling the case.

In some embodiments in accordance with aspects of the disclosure, a device for performing some or all parts of the aforementioned method is disclosed. The device may comprise an input device, an output device, a memory unit, and a processing unit. In some embodiments, the device may communicate with an internal database and/or external database. The device may communicate with a central adjuster control unit so that adjusters may be scheduled and managed. In addition, information may be displayed or reported in various formats across multiple catastrophes. One skilled in the art will appreciate that one or more of the aforementioned methods and features may be embodied as computer-executable instructions stored on a computer-readable medium and executed by a processor.

Other features and advantages of the disclosure will become apparent to those skilled in the art upon review of the following detailed description, claims and drawings in which like numerals are used to designate like features.

BRIEF DESCRIPTION OF THE DRAWINGS

Aspects of the disclosure may take physical form in certain parts and steps, embodiments of which will be described in detail in the following description and illustrated in the accompanying drawings that form a part hereof, wherein.

Although embodiments of various aspects of the invention are disclosed, the invention is not limited in its application to the specific implementations set forth in the following description or illustrated in the drawings. The invention is contemplated to be practiced and carried out in various ways. Also, the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION

As stated above, there are problems associated with efficiently allocating claims adjusters during events where volume increases, such as during a catastrophe. Aspects of the disclosure discussed below describe systems and methods for more efficiently determining workloads of claims adjusters.

Figure 1:
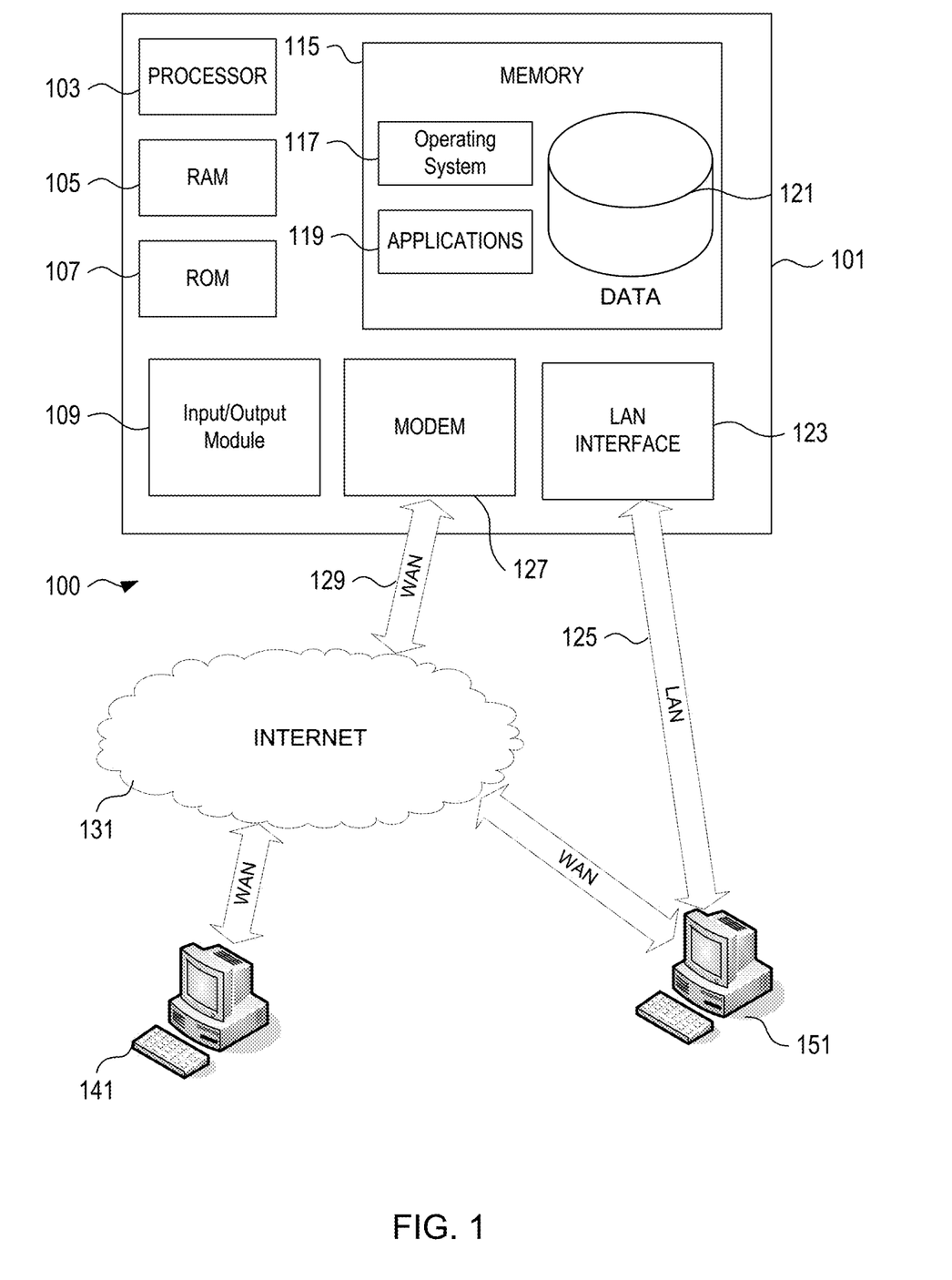
FIG. 1 shows an illustrative operating environment in which various aspects of the disclosure may be implemented.

FIG. 1 illustrates a block diagram of a central adjuster control unit 101 (e.g., a catastrophe server) in communication system 100 that may be used according to an illustrative embodiment of the disclosure. The central adjuster control unit 101 may have a processor 103 for controlling overall operation of the central adjuster control unit 101 and its associated components, including RAM 105, ROM 107, input/output module 109, and memory 115.

I/O 109 may include a microphone, keypad, touch screen, and/or stylus through which a user of central adjuster control unit 101 may provide input, and may also include one or more speakers for providing audio output and a video display device for providing textual, audiovisual and/or graphical output. Software may be stored within memory 115 to provide instructions to processor 103 for enabling device 101 to perform various functions. For example, memory 115 may store software used by the device 101, such as an operating system 117, application programs 119, and an associated internal database 121. In addition, processor 103 and its associated components may allow central adjuster control unit 101 to execute a series of computer-readable instructions to efficiently schedule and manage adjuster workloads based on a threshold number of cases that may be assigned to them.

The central adjuster control unit 101 may operate in a networked environment supporting connections to one or more remote computers, such as terminals 141 and 151. The terminals 141 and 151 may be personal computers or servers that include many or all of the elements described above relative to central adjuster control unit 101. The network connections depicted in FIG. 1 include a local area network (LAN) 125 and a wide area network (WAN) 129, but may also include other networks. When used in a LAN networking environment, the central adjuster control unit 101 is connected to the LAN 125 through a network interface or adapter 123. When used in a WAN networking environment, the central adjuster control unit 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the central adjuster control unit 101 according to an illustrative embodiment of the disclosure may include computer executable instructions for invoking functionality related to managing a "parking lot" (e.g., a storage area within memory) for handling excess cases that are waiting for adjuster assignment.

Figure 2:
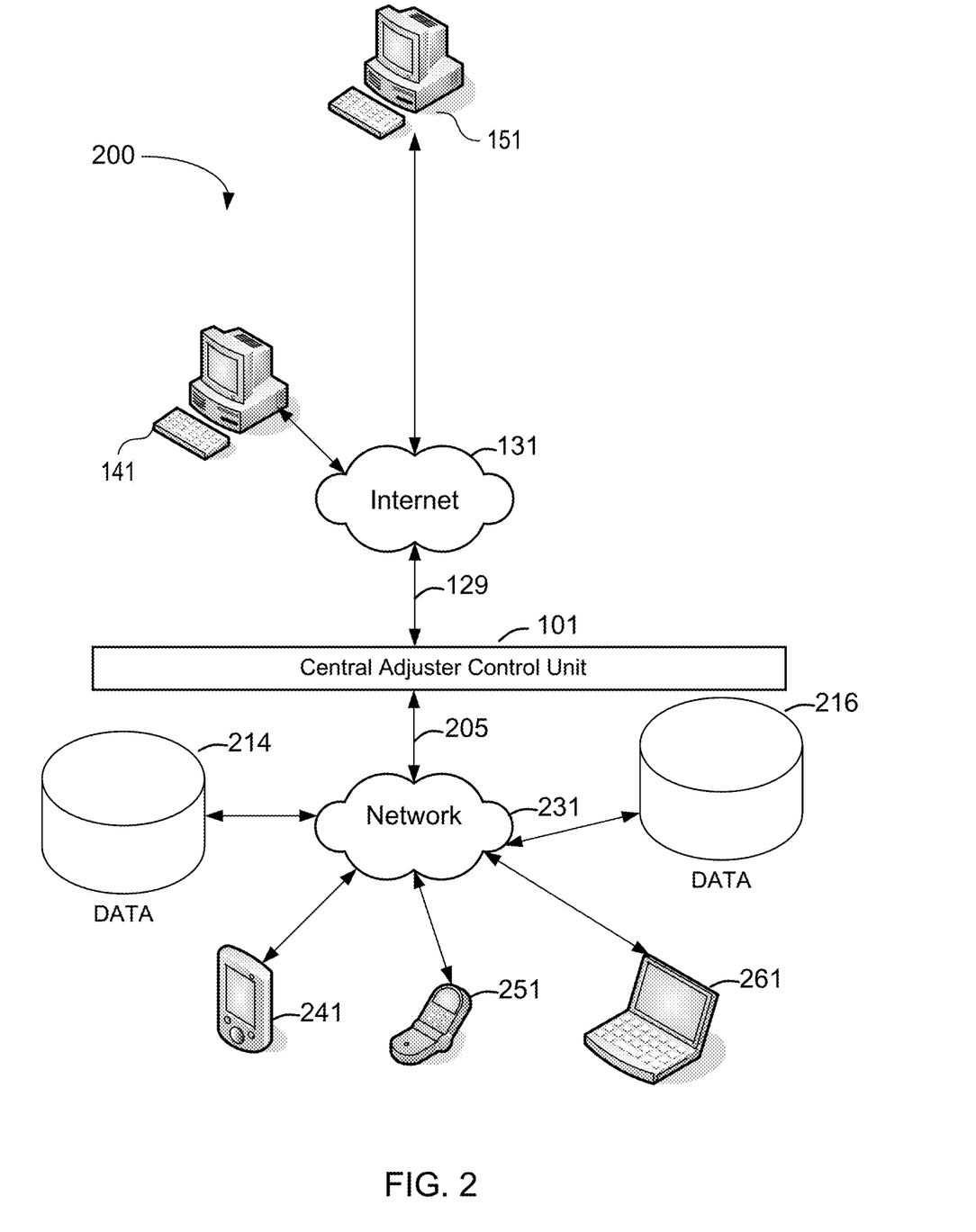
FIG. 2 is an illustrative block diagram of workstations and servers that may be used to implement the processes and functions of certain aspects of the present disclosure.

Referring to FIG. 2, an example of a suitable operating environment in which various aspects of the disclosure may be implemented is shown in the schematic diagram. The computing system 200 is illustrated in one example of a suitable operating environment and is not intended to suggest any limitation as to the scope of use or functionality of the computing system 200. Computing system 200 may also include mobile terminals or phones such as 241 and 251 or laptops such as 261 for use in communication with central adjuster control unit 101 through network 231.

The computing system 200 may also be comprised of one or more databases 214, 216 coupled to a central adjuster control unit 101. The communication between the databases 214, 216 and the central adjuster control unit 101 may be through wired or wireless communication networks (depicted by network cloud 231 via communication link 205). The central adjuster control unit 101 and other devices (e.g., databases 214, 216) may be connected to one or more of the networks via twisted pair wires, coaxial cable, fiber optics, radio waves or other media. The term "network" as used herein and depicted in the drawings should be broadly interpreted to include not only systems in which remote databases are coupled together via one or more communication paths, but also stand-alone devices that may be coupled, from time to time, to such systems that have storage capability. Consequently, the term "network" includes not only a "physical network" but also a "content network," which is comprised of the data—attributable to a single entity—which resides across all physical networks.

The plurality of databases 214, 216 may contain information belonging to or maintained by an insurance company, government entity, and/or third-party entity. For privacy protection reasons, access to the information in these databases 214, 216 may be restricted to only authorized computing devices and for only permissible purposes. For example, a database 214 may comprise a computer internal to an insurance company that contains customer policy information, such as which adjuster has been assigned to any claims made by the customer through his/her policy. The database 214 may also contain information, including but not limited to, the customer's relevant coverage limits/deductibles with insurance carriers, the customer's address information and other personal information, and any other information apparent to one skilled in the art.

In another example, database 214 may also contain predefined business rules and other information to enable the methods disclosed herein. For example, the database 214 may contain data related to the threshold level for a particular claims adjuster. This data may be used, among other things, to optimize the business rules and/or claim segmentation techniques used in the method and systems disclosed herein.

Furthermore, database 216 may comprise an external computer with a large memory store, and run a system, such as a scheduling system, for enabling the assignment of particular adjusters to a customer's claim. Database 216 may contain information about the availability of adjusters and other performers available to an insurance company for processing a claim. In addition, database 216 may provide access to factors corresponding to the catastrophic event, such as wind speed data collected from a third-party vendor/software (e.g., Hurritrak).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Insurance companies provide insurance policies to individuals and businesses to cover loss or damage of property. In return, the customer remits payments to the insurance companies. These payments may be done on a scheduled basis, such as monthly or yearly. The insurance policies may be specific and only cover loss or damage to the property from certain types of occurrences. Alternatively, the insurance policies may be broad and cover loss or damage to the property from many different occurrences. Types of insurance policies include vehicle insurance (including personal automobile, motorcycle, boat, and various commercial lines, etc.), homeowner insurance, renter's insurance, and commercial property insurance. As used here, a customer may include any party that may report a loss to the insurance company, including, but not limited to, an insured party, third-party claimant, insurance agent, attorney, or public adjuster.

When loss or damage occurs to the property, the customer may contact the insurance company to report the loss or damage and make a claim against their policy in order to obtain compensation for the loss or damage to the property. Resources within or external to the insurance company may handle the insurance claim and determine the amount, if any, of compensation due to the customer. Typically, insurance companies provide insurance to a plurality of individuals and businesses within a region.

The following description illustrates examples of insurance claim scheduling processes in accordance with various embodiments of the disclosure. One skilled in the art will appreciate that aspects of the disclosure may be applied to various lines of insurance in different embodiments, including but not limited to, vehicle insurance (including personal automobile, motorcycle, boat, and various commercial lines, etc.), homeowner insurance, renters insurance, commercial property insurance, and other lines and insurance products. It should be noted that in the discussion that follows, a particular application may be described for the purpose of illustration. However, such discussion is for the purpose of describing potential uses of the invention and is not intended to limit the present invention's scope.

The insurance claim scheduling process in a catastrophe may begin before a catastrophic event occurs. The catastrophic events discussed here include, but are not limited to, hurricanes, tsunamis, tornadoes, wildfires, floods, earthquakes and other events. The insurance company may conduct an assessment of a catastrophic event prior to its occurrence in order to better prepare for the effects of the catastrophic event. This pre-assessment may include determining the region or regions where a catastrophic event may occur and estimating the number of potential claims in those regions. The pre-assessment may also include evaluating one or more of a plurality of factors, such as wind speed, rainfall, fire speed, water speed or depth, earthquake magnitude (on the Richter Scale or other scale) or other factors to predict the damage (e.g., the severity of the potential claims based on one or more of the above factors, such as wind speed data) that may be caused by the catastrophic event. The plurality of factors evaluated in the pre-assessment may be obtained by various available means. For example, wind speed data may be obtained electronically through commercially available software (e.g., services provided by Hurritrak or other similar vendors) and then analyzed to forecast weather systems and/or catastrophic events. These factors may also be gathered from sources such as Internet sources detailing weather patterns or collecting and displaying meteorological data. The number of potential claims may be estimated by evaluating various different factors. For example, the number of potential claims may be estimated by evaluating the number of customer insurance policies in a region, the type of catastrophic event, the expected damage caused in the region or a zone (e.g., the severity based on wind speed data), and the types of claims or damage to property resulting from a catastrophic event. Additionally, historical data can be used to determine the expected number of claims in a region. For example, if wind speed is within a certain range, or over a predetermined threshold, historical data may predict the percentage of claims that will be filed (e.g., if wind speeds are greater than 160 mph, 95% of the customers in that region or zone, may file claims).

When an entity (e.g., an insurance company) receives a claim, the first interaction of the entity with the insured (e.g., an individual, organization, etc.) reporting the claim may be known as a first notice of loss (FNOL). These interactions may involve triage (choosing a claim handling strategy) and assignment (assigning handling responsibilities to workgroups and/or individual performers). To carry out these tasks, the entity may employ various types of claims adjusters to perform various activities, including discussing the claim, examining the extent of loss, understanding the cause of loss, analyzing the coverage, and providing compensation for the loss, if deemed appropriate. As used herein, a claims adjuster may be broadly interpreted to include any individual, group, or subgroup that may be involved in the processing of a claim for an entity, such as an insurance company.

Aspects of the disclosure relate to the assignment of a capacity threshold to each claims adjuster associated with an entity when the number of claims received increases dramatically, such as during a catastrophe. The threshold may be the maximum number of assignments that an individual and/or workgroup may take in a given time period (e.g., a day, week, month, year, etc.) In some embodiments, different thresholds may be applied to different types of insurance.

More specifically, the individual claims adjusters may be automatically assigned cases by control unit 101 up to their capacity. The claims remaining, after all the adjusters have reached their threshold, may be moved to a "capacity entity" (e.g., a "parking lot," a holding area, etc.). The capacity entity may be embodied as memory within central adjuster control unit 101 storing information relating to the identity of the excess cases that need adjuster assignment. Once a claim is sent to the holding area, an automated outbound message to the customer may be triggered to indicate that claim information has been received (e.g., through a FNOL) and is waiting to be assigned to an adjuster. The message may also indicate an approximate time that the case will remain in the holding area before being assigned a claims adjuster. When adjusters become available and/or when new adjusters are added to the system, claims may be automatically assigned. The assignment of a claims adjuster may then trigger a second message indicating the identity and/or contact information of the claims adjuster processing the claim.

In some embodiments, control unit 101 may designate that a portion of the adjusters associated with the entity have a specified threshold while another portion of adjusters do not have a threshold (e.g., may be assigned an unlimited number of cases). In such cases, adjusters without a threshold assignment may be known as "normal individuals" or "normal workgroups" (or "normal entities") whereas adjusters with a threshold assignment may be known as "threshold individuals" or "threshold workgroups" (or "threshold entities"). As mentioned before, a "capacity entity" may designate workgroups and/or individuals that may get an assignment when a normal individual or workgroup is unavailable or when the threshold of a threshold entity may have been reached.

The threshold may be calculated by considering the number of claims and/or coverages (see discussion below)

assigned to a particular individual and/or workgroup in a predetermined time period. In certain aspects, a claim may represent a physical file and/or a request for payment tied to an insurance policy. A coverage may represent a subcomponent of protection afforded by the policy, such as the dwelling, unscheduled personal property, additional living expenses, etc. In calculating the active assignment count, the system implementing this process may or may not consider the number of assignments that have been transferred out from the individual and/or workgroup (e.g., reassigned) during the time period. In certain embodiments, if claims are transferred out within the same business day, then these claims cases may not count as an active assignment for a performer. If the active assignment count is less than the threshold value for an individual or workgroup, new cases may continue to be assigned to this individual and/or workgroup. If the active assignment count is equal to or greater than the threshold value for an individual or workgroup, the system may not assign new cases to this individual and/or workgroup. Both open (e.g., cases that have a pending task due) and/or closed claims cases (e.g., cases that do not have a pending task due) may or may not be considered in the assignment count.

In addition, the control unit 101 may consider the specific role of an individual and/or workgroup in determining whether or not an assignment count may be increased for any given assignment. For instance, an entity such as an insurance company may assign some adjusters to the role of a "claim owner" while other adjusters may be assigned the role of a "claim handler." These roles may indicate that a given individual and/or workgroup may have certain responsibilities. For example, a claim owner may be responsible for overseeing the processing of the claim from FNOL to possible compensation for the loss whereas a claim handler may be given specific subtasks as needed by the claim owner. More specifically, the claim owner may be assigned to be the key contact with a customer and may coordinate the handling of a claim. The claim handler may be a party assisting the claim owner, performing a task at the direction of the claim owner. Along these lines, tasks may also be distinguished based on whether or not the task is associated with a claim inquiry itself or with the nature of the coverage associated with an insurance policy, as it relates to the claim inquiry.

For example, consider a scenario in which entity A (with a threshold value of 10) has been assigned 10 claims within a predetermined time period. Suppose that A is a claim handler (but not a claim owner) on 2 of these claims and claim owner on the remaining 8. Suppose also that 3 of the cases are closed, 3 are open, and 2 claims have been transferred to another entity B in the role of claim owner. In this scenario, the total number of assignments of A may be calculated as 8−2=6 (only claim owner cases included here). Because 6 is less than 10, entity A may be considered for assignments of claims.

In addition, the claims adjuster control system 101 underlying the process detailed above may query other modules within a computing device (e.g., a "performer table" that lists individuals/workgroups associated with a particular claim).

Figure 3:
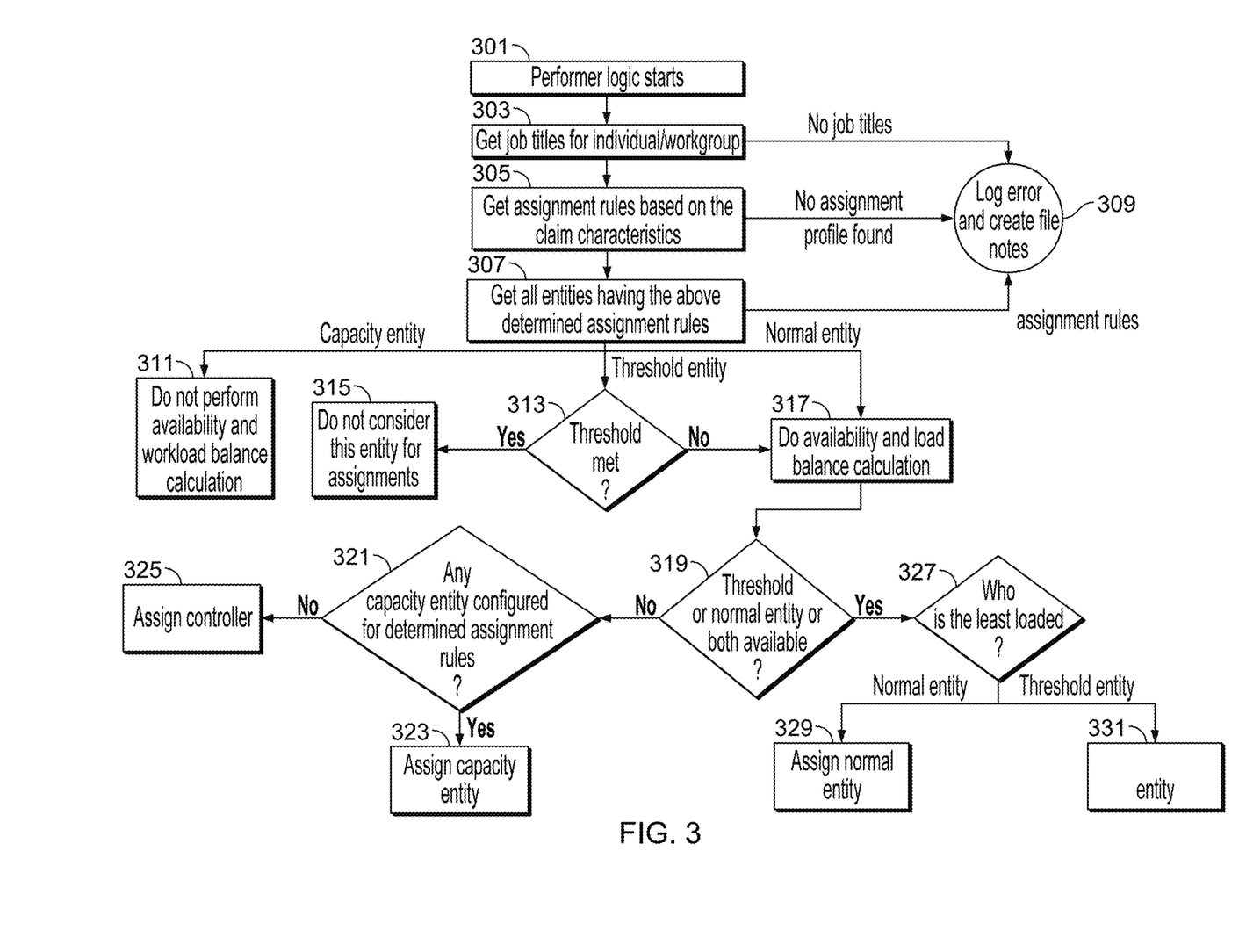
FIG. 3 shows a flow diagram of a process associated with adjuster assignment in accordance with at least one aspect of the disclosure.

FIG. 3 shows a flow diagram of a process associated with adjuster assignment in accordance with at least one aspect of the disclosure. The process may start out at step 301 where the computer logic associated with adjuster allocation (e.g., central adjuster control unit 101) may start. The process may then move to steps 303, 305, and 307 where the job titles and assignment rules (e.g., rules specifying whether an individual and/or workgroup has a threshold, what the threshold is, etc.) associated with individuals/workgroups are obtained from the memory of control unit 101. If any of this information is not available, the process may move to step 309 where an error message may be generated.

Next, the process may move to one of 3 steps based on whether a capacity entity, threshold entity, or a normal entity is considered for a particular claim/coverage case. If a capacity entity is considered (e.g., in the case where all threshold entities have met or exceeded their thresholds or no normal entities are available), the process may move to step 311 where no availability and/or workload balance calculation may be performed (because the capacity entity is a overflow pool with no threshold). If a threshold entity is considered, the process may move to step 313 where control unit 101 may decide if the threshold for that entity has already been met or exceeded. If the threshold has already been met or exceeded, the process may move to step 315 where control unit 101 may not consider this entity for any more assignments. If the threshold for the entity has not been met or exceeded, the process may move to step 317 where an availability and load balance calculation may be computed. This calculation may take into account the task load of other entities (including capacity, normal, and/or other threshold entities) and/or other factors. If a normal entity is considered for a claim/coverage case, the process may also move to step 317 where an availability and load balance calculation may be computed.

Next, the process may move to step 319 where the control unit 101 may determine whether the threshold or normal entity or both are available. If neither a threshold entity nor a normal entity is available, the process may move to step 321 where the control unit 101 may determine whether a capacity entity exists for the assignment rules determined in step 305. If a capacity entity exists, the process may then move to step 323 where the identified capacity entity may be assigned to the claim/coverage case. If a capacity entity does not exist, the process may move to step 325 where a controller (e.g., a system operator, manager, etc.) may be assigned the case.

If a threshold entity and/or a normal entity is available in step 319, the process may move to step 327 where the control unit 101 may determine which entity is the least loaded. If the normal entity is least loaded, this entity may be assigned the case in step 329. Alternatively, if the threshold entity is least loaded, this entity may be assigned the case in step 331.

In implementing the process of FIG. 3, if the central adjuster control unit 101 assigns a particular entity (e.g., as claim owner) for a claim inquiry, the identified entity may also be assigned related coverage cases (e.g., as claim handler). In certain embodiments, the identified entity may be assigned related coverage cases if the entity is the claim owner for the highest ranking claim coverage.

In handling reassignment of claims through a display of a display device associated with control unit 101, the display may include radio buttons, windows, check boxes, fields, etc. In fact, similar displays and features may be associated with many aspects of the disclosure. When a user attempts to reassign cases at the claim level, control unit 101 may search for the highest ranking coverage and bring the performer in the role of claim handler with its assignment group for that coverage. The control unit 101 may copy the same performer and its assignment group on other related coverages and onto the claim in the role of claim owner.

When a user attempts to reassign cases at the coverage level, control unit 101 may search for performers in the role of claim handler (with its assignment group) for the coverage.

When a user attempts to add and/or update performers at the claim/coverage levels in the role of a claim owner/handler, the user may search the performers and may select a role. The user may also select an entity (e.g., threshold, normal, etc.) to handle the claim/coverage. If the selected entity is a threshold entity, the control unit 101 may compare the current assignment load for this entity with the threshold value set for the entity. If the threshold has not been met or exceeded, control unit 101 may assign the case to the threshold entity. If the threshold has been met or exceeded, control unit 101 may display a message, asking the user whether the threshold should be overridden and/or requesting the user to select another performer. If the user decides to override the threshold for a threshold entity, control unit 101 may assign the claim/coverage to the selected entity. Alternatively, the user may cancel out of the message to remain on the same screen.

When coverage cases may be added for an entity, control unit 101 may assign this entity as claim handler if the individual and/or workgroup has its own assignment group. Otherwise, the system may assign the entity the role of a claim owner. The control unit 101 may also check the threshold capacity of a threshold entity when a user attempts to assign a new coverage case to the threshold entity. If the entity's threshold is not met, control unit 101 may assign the coverage to the entity; otherwise, the coverage may be assigned to a claim owner. In certain embodiments, there may or may not be a check of a threshold when assigning a coverage to a claim owner.

When a user attempts to perform multiple reassignments through a display associated with control unit 101 for a claim handler/claim owner, control unit 101 may consider the claim count of a selected individual and/or workgroup. If the threshold has not been met, control unit 101 may assign the case to the selected entity. If the threshold value has been met, control unit 101 may ask the user if the threshold should be overridden. If yes, control unit 101 may reassign the cases to the selected entity. If no, then control unit 101 may cause the display of a search screen to search for additional entities. If the threshold has not been met but the reassignment is more than the threshold (e.g., threshold is 10, current assignment is 8 and claims which need to be reassigned are 5), then the cases may be reassigned to bring the entity's workload up to the capacity. Following this reassignment, a message stating that a portion of the cases have been reassigned but the remaining cases have not may be displayed to a user. Control unit 101 may give the user an option of reassigning the remaining cases to the entity by overriding the threshold. Otherwise, a new entity may be selected for assignment of the remaining cases.

In accordance with other aspects of the disclosure, information regarding capacity entities (e.g., waiting areas for claims/coverages) may be displayed on a display device associated with control unit 101. Various groups/individuals may view and edit this information within an organization. In one embodiment, groups/individuals within an organization (e.g., an insurance company) that may view information regarding the capacity entity may include a librarian, administration group, scheduler group, security group, leadership group, and/or a "super user" group. The "super user" group may be individuals/groups within the organization with special privileges with regard to access to software/hardware related to control unit 101. Groups/individuals that are allowed to edit information related to the capacity entity may be the same as or different from the groups mentioned above. In certain embodiments, only the librarian may enable a workgroup to be a capacity entity.

In addition, a display screen associated with control unit 101 may display information related to one or more threshold entities. The display screen may display a threshold entity checkbox for indicating that any given entity is a threshold entity. If the checkbox is unselected, the entity may be designated as a normal entity. In addition, a threshold capacity checkbox may be used to enter a threshold value associated with the threshold entity. A third checkbox may allow a user to select whether or not the threshold entity should receive new assignments only from the capacity entity. If this checkbox is checked, the associated individual/workgroup may not receive claims through FNOL. Instead, these individuals/workgroups may receive claims only from a capacity entity, reassignment at the claim and/or coverage level screen, add/update performer at claim/coverage level screen, and from the multiple reassignment screen mentioned above. Editing/viewing rights to information regarding the threshold entities may be given to groups similar to the groups/individuals discussed above with viewing/editing rights to a capacity entity.

Control unit 101 may also cause the display of various error messages under certain scenarios. For instance, when a user indicates that an individual/workgroup is a threshold entity and tries to save this information without entering any value for the threshold capacity, the system may display an error message such as: "You have marked this entity as a threshold entity. Please enter a threshold capacity value." In addition, when a user selects both the capacity and threshold entity checkboxes and clicks on the save button, the system may display an error message such as: "You cannot have the same entity as a capacity entity and a threshold entity. Please uncheck one of the checkboxes."

As mentioned earlier, individuals/groups may have various job titles/roles within an organization (e.g., an insurance company). These roles may or may not be associated with the threshold, normal, and/or capacity entity designations at the workgroup or individual level. Example roles may include "adjuster-pilot inside," "adjuster-non injury," "adjuster-litigation," "specialist-comprehensive loss," "adjuster-major," "adjuster-moderate," "adjuster-moderate represented", "adjuster-moderate unrepresented," "coordinator," "claim processor handler," "coordinator-claim," "contingent worker-exempt inside," "specialist," "processor-express," "file examiner," "adjuster-inside," "injury causality-soft tissue represented," "injury causality-soft tissue unrepresented," "adjuster-liability determination," "adjuster-major represented," "adjuster-major unrepresented," "property dispatch," "total theft service adjuster," "specialist-coverage," "comprehensive loss specialist," and "customer report administrator."

Figure 4:
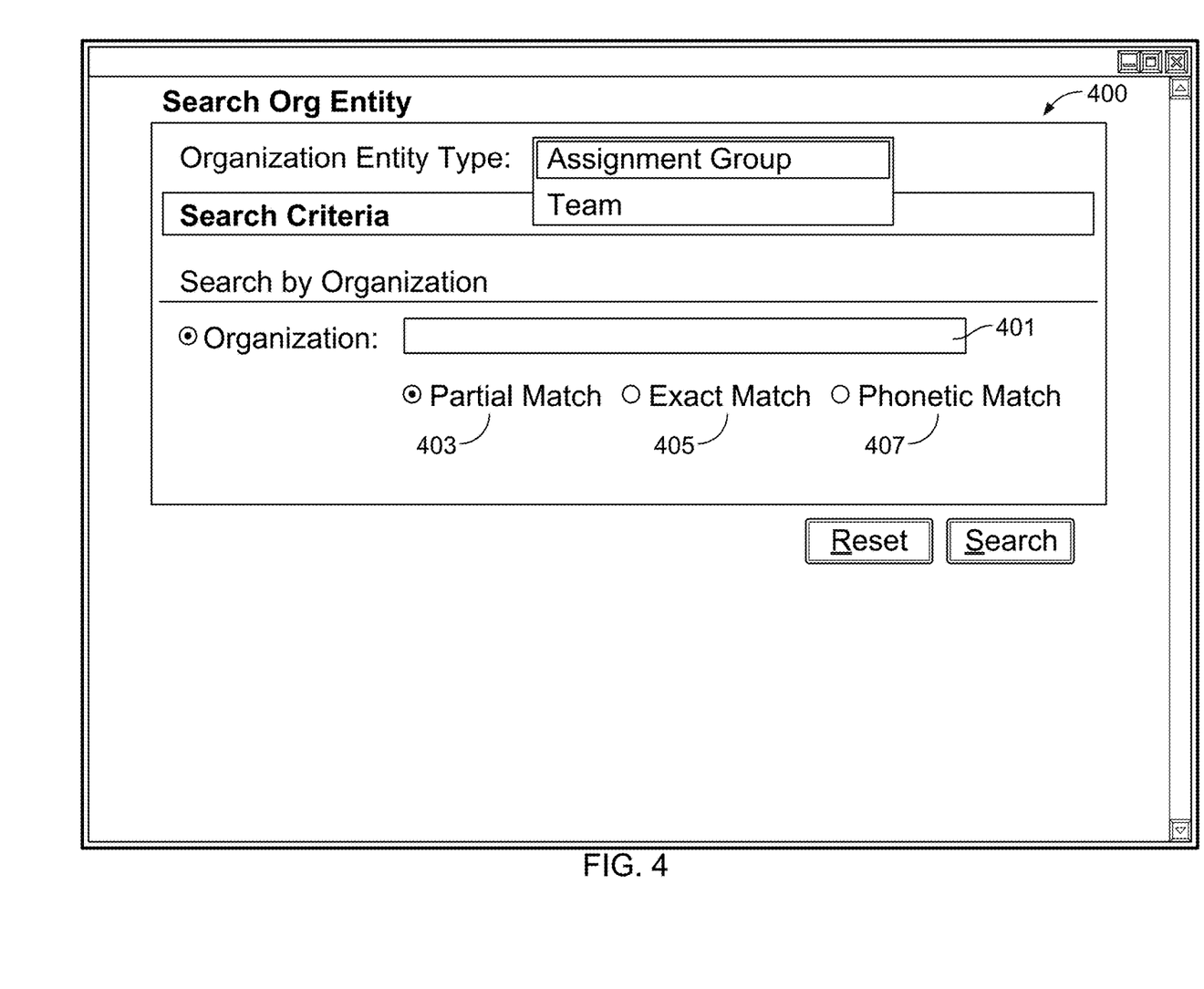
FIG. 4 shows a first example display screen in accordance with at least one aspect of the disclosure.

In certain aspects, a display device associated with control unit 101 may also display a bulk threshold update search screen 400, as shown in FIG. 4. This screen 400 may allow users to search for an assignment group/business unit with an aim toward updating a threshold value associated with the assignment group/business unit and/or restricting the assignment group/business unit from receiving new claim cases from a FNOL. The user may search through all available assignment groups/business units associated with an organization through a keyword search feature 401 and may use search features including a partial match feature 403, an exact match feature 405, and/or a phonetic match feature 407. The partial match feature 403 may allow a user to enter only a portion of the complete assignment group/business unit name. The exact match feature 405 may return only those assignment groups/business units that match exactly to the entered keyword. Finally, the phonetic match feature 407 may return those assignment groups/business units that match the way the entered keyword(s) sounds.

Figure 5:
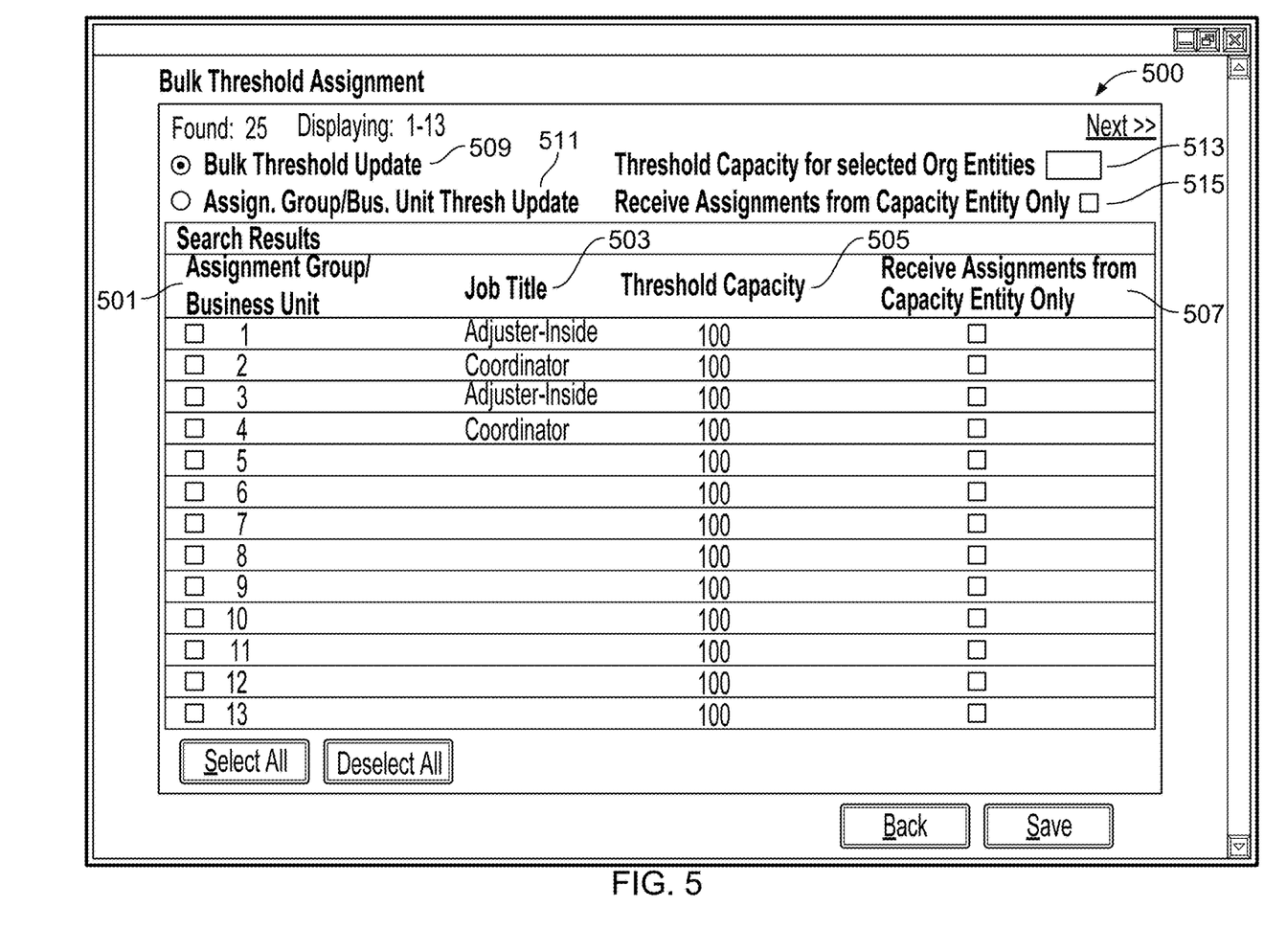
FIG. 5 shows a second example display screen in accordance with at least one aspect of the disclosure.

When a user selects a particular assignment group/business unit from the search results, a subsequent screen 500 may allow the user to update the threshold in bulk for all assignment groups/business units associated with a selected assignment group (or team), as shown in FIG. 5. The displayed fields for a particular assignment group/business unit may include the name of the assignment group/business unit 501, job title 503, current threshold capacity 505, and a checkbox 507 for receiving assignments only from a capacity entity.

On screen 500, information may be updated via a bulk threshold update option (e.g., for updating the threshold value of all members of an assignment group) 509, an assignment group/business unit threshold update option (e.g., for updating a threshold value only for one or more members of the assignment group) 511, a threshold capacity option for updating the threshold value for selected assignment groups/business units 513, and an option to receive assignments only from a capacity entity for a given assignment group/business unit 515. These options may be displayed on the screen 500 as radio buttons, text boxes, and checkboxes, among other things. In addition, an option may be selected to save any updated information.

In certain aspects, the multiple reassignment search screen may include a field called "loss state" (e.g., state where the loss resides, property address, etc.).

In accordance with certain aspects of the disclosure, a batch process may be used to move claims out of a capacity entity and into a threshold and/or normal entity. The cases may be moved out of the capacity entity and into the threshold and/or normal entity on a first in first out (FIFO) basis.

While specific examples have been described, those skilled in the art will appreciate that there are numerous variations and permutations of the above-described systems and methods that fall within the spirit and scope of the disclosure. Additionally, while specific examples of methods and steps have been disclosed, steps may be omitted or steps may be reordered, while still accomplishing similar results. Other features and advantages of aspects of the disclosure will be apparent from the description, drawings, and claims.

What is claimed is:

1. A method of improved determining of potential claims in a region where a catastrophic event may take place and improved claims adjuster response time to new claims should the catastrophic event occur comprising:
  (i) automatically determining, by a central adjuster control unit, at least one region where a catastrophic event may take place, wherein the determining comprises real-time monitoring of real-time data associated with the region before the catastrophic event occurs, wherein the real-time data is measured by a sensor and selected from a group consisting of wind speed, rainfall, fire speed, water speed, water depth, and earthquake magnitude, and determining that the real-time data is within a first predetermined range or over a first predetermined threshold, wherein the first predetermined range or first predetermined threshold is based on corresponding historical data;
  (ii) automatically estimating, by a processor of the central adjuster control unit, a number of potential claims in the at least one region should the catastrophic event occur, wherein the estimating comprises automatically compiling and evaluating the real-time data, a number of customer insurance policies in the region, a type of catastrophic event, the expected damage caused in the region, a type of claims resulting from the catastrophic event, and determining that the real-time data is within a second predetermined range or over a second predetermined threshold, wherein the second predetermined range or second predetermined threshold is based on corresponding historical data;
  (iii) automatically determining, by the processor of the central adjuster control unit, identities of a plurality of claims adjusters for handling the potential claims should the catastrophic event occur in the at least one region;
  (iv) automatically storing the identities of the plurality of claims adjusters in a memory of the central adjuster control unit;
  (v) automatically determining, by the processor of the central adjuster control unit, a plurality of threshold numbers of claims cases involving a plurality of claims related to a plurality of insurance policies that each of the plurality of claims adjusters is capable of handling during a predetermined time period; and
  (vi) automatically notifying, by the central adjuster control unit, the plurality of claims adjusters determined in step (iii) of the likely catastrophic event and a number of potential claims that each of the plurality of claims adjusters determined in step (iii) is likely to receive during a period of time should the catastrophic event occur, and automatically identifying, by the central adjuster control unit, additional adjusters who are not otherwise identified in step (iii) to handle claims in the particular region, and automatically notifying, by the central adjuster control unit, the identified additional adjusters of the likely catastrophic event and a number of potential claims that each of the identified additional adjusters is likely to receive during a period of time should the catastrophic event occur.

2. The method of claim 1, further comprising: receiving a new claims case through a communication module associated with the central adjuster control unit; and automatically transmitting, by the communication module and to an insured party associated with the new claims case, a message detailing an approximate waiting time for the new claims case to be assigned to one of the plurality of claims adjusters when the new claims case is stored in the memory of the central adjuster control unit.

3. The method of claim 2, further comprising: automatically transmitting, by the communication module and to the insured party associated with the new claims case, a message detailing an identity and contact information of an assigned claims adjuster when the new claims case is assigned to one of the plurality of claims adjusters.

4. The method of claim 1, further comprising receiving a new claims case through a communication module associated with the central adjuster control unit, wherein the new claims case is received through a first notice of loss from an insured party associated with the new claims case.

5. The method of claim 4, wherein the new claims case is assigned to a claims adjuster on a first-in, first-out (FIFO) basis.

6. The method of claim 1, further comprising receiving a new claims case through a communication module associated with the central adjuster control unit, wherein the new claims case is assigned to a claims adjuster on a first-in, first-out (FIFO) basis.

7. A non-transitory computer-readable storage medium having computer-executable program instructions stored thereon that when executed by a processor of a central adjuster control unit, cause the processor to perform steps comprising:
(i) automatically determining at least one region where a catastrophic event may take place, wherein the determining comprises real-time monitoring of real-time data associated with the region before the catastrophic event occurs, wherein the real-time data is measured by a sensor and selected from a group consisting of wind speed, rainfall, fire speed, water speed, water depth, and earthquake magnitude, and determining that the real-time data is within a first predetermined range or over a first predetermined threshold, wherein the first predetermined range or first predetermined threshold is based on corresponding historical data;
(ii) automatically estimating a number of potential claims in the at least one region should the catastrophic event occur, wherein the estimating comprises automatically compiling and evaluating the real-time data, a number of customer insurance policies in the region, a type of catastrophic event, the expected damage caused in the region, a type of claims resulting from the catastrophic event, and determining that the real-time data is within a second predetermined range or over a second predetermined threshold, wherein the second predetermined range or second predetermined threshold is based on corresponding historical data;
(iii) automatically determining identities of a plurality of claims adjusters for handling the potential claims should the catastrophic event occur in the at least one region;
(iv) storing the identities of the plurality of claims adjusters in a memory of the central adjuster control unit;
(v) determining a plurality of assignment rules that assign a plurality of claims cases to a plurality of claims adjusters, wherein at least one of the plurality of assignment rules indicates a plurality of threshold numbers of claims cases available for assignment to each of a portion of the plurality of claims adjusters; and
(vi) automatically notifying the plurality of claims adjusters determined in step (iii) of the likely catastrophic event and a number of potential claims that each of the plurality of claims adjusters determined in step (iii) is likely to receive during a period of time should the catastrophic event occur, and automatically identifying additional adjusters who are not otherwise identified in step (iii) to handle claims in the particular region, and automatically notifying the identified additional adjusters of the likely catastrophic event and a number of potential claims that each of the identified additional adjusters is likely to receive during a period of time should the catastrophic event occur.

8. The computer-readable storage medium of claim 7, wherein the computer-executable program instructions further cause the processor to perform receiving a new claims case for assignment to one of the plurality of claims adjusters, wherein the new claims case relates to a property insurance policy.

9. The computer-readable storage medium of claim 7, wherein the computer-executable program instructions further cause the processor to perform receiving a new claims case for assignment to one of the plurality of claims adjusters, wherein the new claims case relates to an auto insurance policy.

10. The computer-readable storage medium of claim 7, wherein the computer-executable program instructions further cause the processor to perform: automatically transmitting, to an insured party associated with a new claims case, a message detailing an approximate waiting time for the new claims case to be assigned to one of the plurality of claims adjusters when the new claims case is stored in the memory.

11. The computer-readable storage medium of claim 7, wherein the computer-executable program instructions further cause the processor to perform: automatically transmitting, to an insured party associated with a new claims case, a message detailing an identity and contact information of an assigned one of the plurality of claims adjusters when the new claims case is assigned.

12. The computer-readable storage medium of claim 7, wherein the computer-executable program instructions further cause the processor to perform: updating at least one of the plurality of threshold numbers of claims cases that can be assigned to each of the portion of the plurality of claims adjusters.

13. The computer-readable storage medium of claim 7, wherein the computer-executable program instructions further cause the processor to perform: reassigning a plurality of assigned claims cases to another one of the plurality of claims adjusters.

14. The computer-readable storage medium of claim 7, wherein the computer-executable program instructions further cause the processor to perform: preventing at least one of the plurality of claims adjusters from receiving any new claims cases through a first notice of loss (FNOL) process.

15. An apparatus for improved determining of potential claims in a region where a catastrophic event may take place and improved claims adjustor response time to new claims should the catastrophic event occur comprising:
a processor of a central adjuster control unit; and
a memory configured to store computer-readable instructions that, when executed by the processor, cause the processor to perform a method comprising:
(i) automatically determining at least one region where a catastrophic event may take place, wherein the determining comprises real-time monitoring of real-time data associated with the region before the catastrophic event occurs, wherein the real-time data is measured by a sensor and selected from the group consisting of wind speed, rainfall, fire speed, water speed, water depth, and earthquake magnitude, and determining that the real-time data is within a first predetermined range or over a first predetermined threshold, wherein the first predetermined range or first predetermined threshold is based on corresponding historical data;
(ii) automatically estimating a number of potential claims in the at least one region should the catastrophic event occur, wherein the estimating comprises automatically compiling and evaluating the real-time data, a number of customer insurance policies in the region, a type of catastrophic event, the expected damage caused in the region, a type of claims resulting from the catastrophic event, and determining that the real-time data is within a second predetermined range or over a second predetermined threshold, wherein the second predetermined range or second predetermined threshold is based on corresponding historical data;

(iii) automatically determining identities of a plurality of claims adjusters for handling the potential claims should the catastrophic event occur in the at least one region;

(iv) automatically storing the identities of the plurality of claims adjusters in a memory of the central adjuster control unit;

(v) providing a first plurality of claims adjusters that are each associated with one of a plurality of threshold numbers of claims cases;

(vi) providing a second plurality of claims adjusters that are not associated with any of the plurality of threshold numbers of claims cases; and (vii) automatically notifying the plurality of claims adjusters determined in step (iii) of the likely catastrophic event and a number of potential claims that each of the plurality of claims adjusters determined in step (iii) is likely to receive during a period of time should the catastrophic event occur, and automatically identifying additional adjusters who are not otherwise identified in step (iii) to handle claims in the particular region, and automatically notifying the identified additional adjusters of the likely catastrophic event and a number of potential claims that each of the identified additional adjusters is likely to receive during a period of time should the catastrophic event occur.

16. The apparatus of claim 15, wherein the processor further performs:

receiving a plurality of new claims cases;

automatically assigning each of the plurality of new claims cases to one of the first or second plurality of claims adjusters based on availability; and when the one of the first or second plurality of claims adjusters is not available, automatically storing any excess claims cases from the plurality of new claims cases in the memory of a central adjuster control unit until determining that at least one of the first or second plurality of claims adjusters not previously available becomes available, and automatically assigning any of the stored excess claims cases to the at least one of the first or second plurality of claims adjusters, wherein the excess claims cases are automatically assigned by the processor to the at least one of the first or second plurality of claims adjusters on a first-in, first-out (FIFO) basis.

17. The apparatus of claim 15, wherein the processor further performs: automatically updating the plurality of threshold numbers via a display associated with the apparatus.

18. The apparatus of claim 15, wherein the processor further performs: changing a status of at least one of the first plurality of claims adjusters to be included as a member of the second plurality of claims adjusters.

19. The apparatus of claim 15, wherein the processor further performs a method comprising: receiving a new claims case; storing the new claims case in the memory of the central adjuster control unit; and automatically transmitting, to an insured party associated with the new claims case, a message detailing an approximate waiting time for the new claims case to be assigned to one of the claims adjusters.

20. The apparatus of claim 19, wherein the processor further performs a method comprising: assigning the new claims case to one of the claims adjusters; and transmitting, to the insured party associated with the new claims case, a message detailing identity and contact information of the assigned claims adjuster.

* * * * *